United States Patent [19]

Dunn

[11] Patent Number: 5,833,014

[45] Date of Patent: Nov. 10, 1998

[54] RECIPROCATING TOOL HANDLE

[76] Inventor: Herbert Dunn, 12423 Eastern Ave., Chase, Md. 21220

[21] Appl. No.: 619,254

[22] Filed: Mar. 18, 1996

[51] Int. Cl.[6] ................................ B24D 15/02; B25F 5/00
[52] U.S. Cl. ........................ 173/162.2; 15/22.2; 451/351; 451/354; 451/524
[58] Field of Search .................................. 15/22.2, 50.2, 15/52.2, 21.1, 22.1; 451/354, 356, 350, 351, 525, 524, 523; 173/162.1, 162.2

[56] References Cited

U.S. PATENT DOCUMENTS

| | | | |
|---|---|---|---|
| 1,712,579 | 5/1929 | Nichols | 15/22.2 |
| 3,216,734 | 11/1965 | Thompson | 15/22.1 |
| 4,685,252 | 8/1987 | Ponce | 451/354 |
| 4,829,719 | 5/1989 | Braselton | 451/354 |
| 4,885,876 | 12/1989 | Henke | 451/525 |
| 4,928,343 | 5/1990 | Kissinger | 451/524 |
| 5,205,079 | 4/1993 | Lashley et al. | 451/354 |
| 5,224,231 | 7/1993 | Nacar | 15/22.2 |
| 5,658,193 | 8/1997 | McCambridge | 451/351 |

*Primary Examiner*—Scott A. Smith
*Attorney, Agent, or Firm*—Peter Gibson

[57] ABSTRACT

About a rigid longitudinal extension a sleeve is frictionally suspended such that the extension may reciprocate freely within the sleeve while remaining relatively stationary longitudinally. The rear end of the extension is attachable to a reciprocating portable power tool and the forward end is attached to a tool head. In operation, the extension and the tool head reciprocate while the sleeve, grasped in one hand, is frictionally isolated from the reciprocation and consequently insulated from the vibration associated with the operation of a portable reciprocating portable power tool. A coupling upon the forward end of the extension facilitates the attachment of a variety of different tool ends. Frictional suspension of the sleeve about the extension by using a pair of springs or by using bearings between the sleeve and the extension is suggested. A flat platform tool head, primarily for sanding, brush heads and blade heads are also specifically suggested, as is coupling by use of threading and by use of hook and catch.

20 Claims, 2 Drawing Sheets

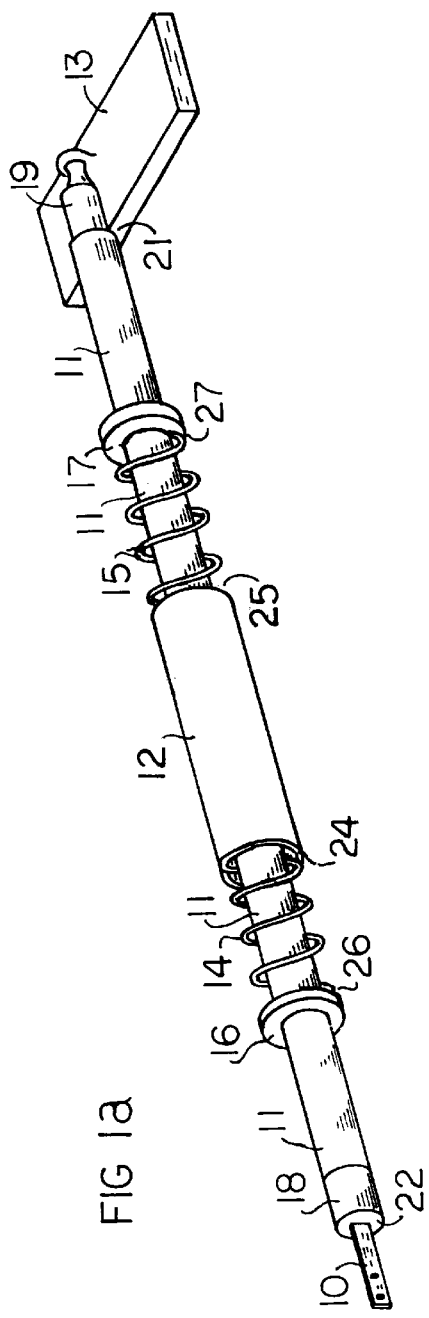
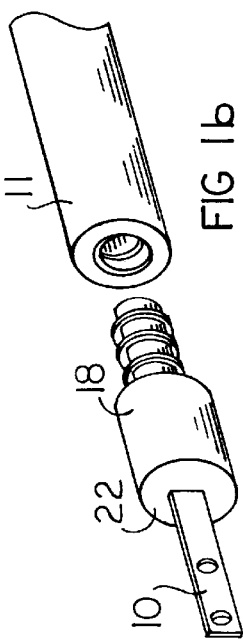
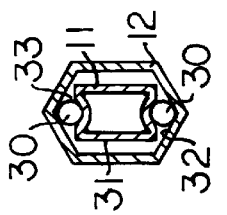
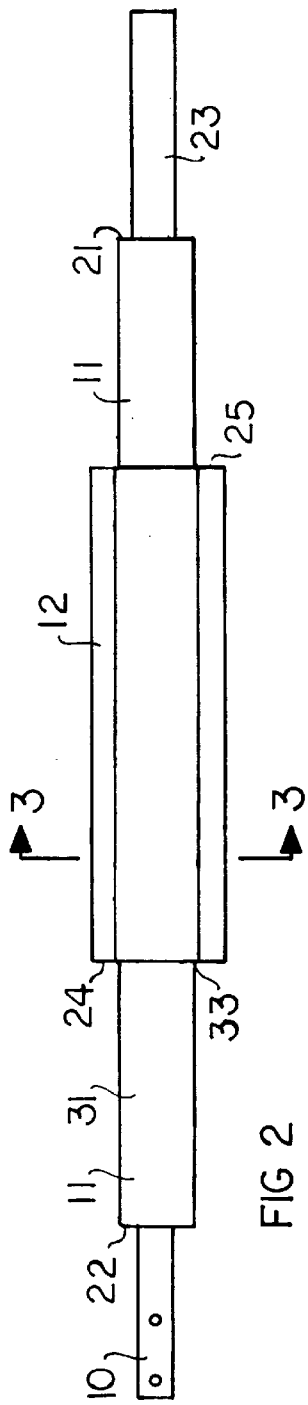

RECIPROCATING TOOL HANDLE

BACKGROUND OF THE INVENTION

Field of the Invention

The field of the present invention relates generally to tools, more particularly to tool handles and specifically to tool handles for portable reciprocating drive tools.

General Background

Hand held reciprocating tools, particularly saws, have recently become a commonplace. Recent advances is batteries have enabled reciprocating power tools which are cordless, ie. independent of an A.C. power supply which, to the belief of the applicant, accounts for the increasing popularity of these tools. Both Makita™ and Black & Decker™ are known to manufacture and sell battery operated, hand held reciprocating power saws. At present only saw blades are known to be generally utilized. And in all cases, the saw blade is directly attached to an exposed reciprocating member of the tool without any known use of a significant extension of the reciprocating member.

It is emphasized that cordless hand held reciprocating power tools are relatively new and that most hand held power tools are not reciprocating but are rotary. This is understood as a natural consequence of the basic fact that electric motors are rotary and a rotating shaft is the primary means for transferring energy converted by electric motors. If reciprocation of the tool end is desired a secondary conversion of shaft power is therefore required. Consequently, a wide plethora of tools, tool ends and a multitude of various uses given to a single hand held rotary shaft tool, such as an electric drill or torque wrench, are well known. However, present known utilization of portable reciprocating power tools is restricted to that of various saw blades attached directly to an exposed reciprocating member of the power tool.

In more general comparison, only a few particularized reciprocating tools are well known and commonly used, the jig saw being the most widely utilized. Even in applications wherein a linear action is desired a continuous belt revolving about two spindles spaced apart and in parallel with each other is generally preferred to a reciprocating motion. The sanding of wood, for example, requires a linear motion in order to preserve the grain. Hand held belt sanders are well known and serve to demonstrate the particularization with regard to function which characterizes reciprocating tools. Stationary belt sanders and stationary non-rotary blade saws employ the same principle, using a continuous loop about two spindles, at least one of which is driven by a rotary shaft. A chain saw is another example wherein a continuous loop is employed instead of the reciprocating manual saw it replaces. Generally then, reciprocation in electrically driven tools has been avoided and electrically powered reciprocating tools are a relatively new and novel item to carpenters, homeowners and the public at large.

Discussion of the Prior Art

Many examples are known of a spring attached to a tool handle to cushion the impact and resultant vibrations transmitted to the handle in use of the tool. U.S. Pat. Nos. 604,379 issued May 24, 1898 to J. J Flyckt for a 'Chisel Holder' and U.S. Pat. No. 1,120,947 issued Dec. 15, 1914 to L. T. Langager for a 'Chisel Handle' provide early examples. An example utilizing two springs to dampen vibrations resulting from impact may be found in U.S. Pat. No. 2,211,682 issued Aug. 13, 1940 to L. E. Yeoman for a 'Tool Handle'. This reference disclosures, as do the first two mentioned, a combined chisel and holder.

Examples are also known of a single spring disposed about a shaft in compression between a sleeve longitudinally displaceable along the shaft and another member of the tool fixedly attached to the shaft for biasing shut the jaws of a tool. U.S. Pat. No. 1,196,703 for a 'Tool' issued to H. Kraut Aug. 29, 1916 discloses such a device as do U.S. Pat. Nos. 1,301,185 and 1,539,221 issued Apr. 22, 1919 and May 26, 1925 to N. C. Sorensen and J. W. Tennant for 'Tongs' and 'Welder's Rod Holder', respectively. While utilizing sleeves about a longitudinally displaceable member, these devices are generally tongs with jaws biased shut.

The most pertinent reference known in the prior art with regard to similar structure is considered to be U.S. Pat. No. 5,088,174 issued Feb. 18, 1992 to Hull et al. for a 'Forcible Entry Tool' as it is "provided (with) spring cushions on the handles to eliminate undue shock to the hands of the operators" and "whereby at least two persons can comfortably manipulate, use and control the device" (Abstract). It is an impact blow which is 'cushioned' by the springs in this disclosure as in the earlier references identified above as essentially comprising a combined chisel and holder, as opposed to tongs using a spring to bias jaws shut.

Statement of Need

The vibration associated with the operation of a portable reciprocating power saw is considerable. An extension of the exposed reciprocating member of the power tool and the tool end would enable new reciprocating power applications such as sanding and scrubbing which require extension. However, a reciprocating extension must be supported to avoid catastrophic failure and it should further be supported in a manner that allows the tool end to be directed effectively. Any handle to such an extension must be insulated from the vibration associated with driving of the reciprocating members.

It is therefore considered that a need exists for the provision of some means of both supporting and guiding an extension of a reciprocating tool end which would enable new applications for portable reciprocating power tools.

SUMMARY OF THE INVENTION

Objects of the Invention

The encompassing objective of the principles relating to the present invention is the provision for an extension of a reciprocating tool end which includes means of enabling the support and guidance of this extension with just one hand in operation.

A principal objective of the principles relating to the present invention is the provision for an extension of a reciprocating tool end which facilitates support and guidance of the extended tool end with one hand without impairing reciprocation of the extension.

Another principal objective of the principles relating to the present invention is the provision for an extension of a reciprocating tool end which facilitates support and guidance with one hand of any one of a variety of different extended tool ends.

An ancillary objective of the principles relating to the present invention is an extension for a reciprocating tool end which possesses a handle that is relatively stationary with respect to the reciprocation of the extension during operation.

Another ancillary objective of the principles relating to the present invention is an extension for a reciprocating tool end which possesses a handle insulated from the vibration associated with the operation of a reciprocating power tool.

An auxiliary objective of the principles relating to the present invention is an extension for a reciprocating tool end that may be grasped with one hand which possesses a coupling between the extension and the tool end which is resistant to loosening induced by the vibration associated with operation of a reciprocating power tool.

Another auxiliary objective of the principles relating to the present invention is an extension for a reciprocating tool end that may be grasped with one hand which is simple and inexpensive in construction.

Principles Relating to the Present Invention

It is first considered that a practical extension of a reciprocating tool end must be substantially rigid with regard to lateral deflection during both compression and tension adequate to effectively transfer the energy associated with the reciprocation to an extended tool end. Hence the phrase 'substantially rigid extension', as utilized herein is understood to connote sufficient rigidity in the member so described to enable transfer of the reciprocating motion provided by a hand held portable reciprocating power tool to an extended tool end with a force and resistance to lateral deformation sufficient to perform the intended function.

Secondly, it is considered that a handle which may be grasped by one hand and which provides guidance and support of a tool end attached to such an extension without impairing its reciprocation basically defines a sleeve about said extension which is of sufficient length to permit grasping by one hand without allowing the hand to contact the rigid extension about which the sleeve is disposed. The sleeve has an exterior, which is grasped, and an interior, through which the rigid extension must be able to reciprocate without significant hindrance. This is not to say that the interior of the sleeve cannot contact the extension but that such contact must not be unduly restrictive of reciprocation of the extension relative to the sleeve.

It is considered that this may be accomplished with either of two basic structures. In one case the sleeve is in slidable contact with the extension but the effective friction between the interior of the sleeve and the contacted portion of the extension is low. This may be facilitated by smooth contacting surfaces, appropriate materials possessing low friction coefficients, lubrication, bearings between the two, et cetera. In the second case, which is preferred, direct contact between the extension and the sleeve is largely avoided with a suspension of the sleeve concentrically with the extension. This requires a connection at either end of the sleeve to the extension which accommodates the reciprocation of the extension relative to the sleeve. This preferred approach is readily effected by a spring at either end concentric to the extension each possessing contact with one end of the sleeve and a portion of or attachment to the extension.

It is observed that the distance between the end of the sleeve and the portion of the extension or the attachment to the extension with which a spring has contact is not unimportant. This distance must be somewhat less than the uncompressed length of the spring disposed there if the spring is to be in compression, or somewhat longer than the free length of the spring if in tension. In either case, it is recommended that the amount of compression or tension be relatively small and that this distance be relatively close to the free length of the spring. The difference between this distance and the free length of the spring utilized ideally is substantially equal to the travel of the reciprocating tool end.

The use of such a pair of springs at either end of the sleeve, disposed in accordance with the principles discussed immediately above achieves several objectives. Firstly the pair of springs, properly disposed, maintains the sleeve in a suspension which minimizes contact between the sleeve interior and the underlying exterior surface of the reciprocating extension. Secondly, this pair of springs also maintains the sleeve in a longitudinally stationary position with regard to the reciprocating extension during operation. Thirdly, this pair of springs provides dampening of the vibration associated with operation of the reciprocating tool transmitted to a hand grasping the sleeve. All these objectives may be achieved by other means. The pair of springs described herein is simply considered the simplest, most elegant means of achieving these objectives.

It is necessary that the extension possess means of attachment to a reciprocating tool at one end and further possess either a tool end at the other end or, preferably, a coupling facilitating the attachment of one of a variety of tool ends. This attachment or coupling is further preferably resistant to loosening during operation. In one preferred embodiment of the principles relating to the present invention a relatively large pitch threading is utilized, further preferably possessing a square or Acme form and cut in a resilient material such as nylon which will yield excellent resistance to loosening under operating conditions which involve considerably vibration. Other means of attachment or coupling will readily achieve the objectives addressed thereby and thereby be in accordance with the principles relating to the present invention. The relatively large pitch, preferably square or Acme form thread recommended is a standard threading for several tool ends which are screwed onto the end of a pole for manual reciprocation and therefore this threading will facilitate the attachment of existing tool ends appropriate to operation by reciprocation.

With regard to the objective of simple and inexpensive construction, it is suggested that a wooden pole be utilized for the rigid extension, that the sleeve comprise a length of extruded plastic such as polyvinylchloride (PVC) tubing or conduit. It is suggested that the outer diameter of the sleeve and the springs, if utilized, be substantially similar. If a coupling allowing removable attachment of one of a variety of tool ends is utilized, as recommended, this coupling may also be comprised of standard PVC conduit couplings of about three quarters of an inch diameter. It is further recommended that attachment to the reciprocating member of a hand held portable reciprocating power tool be facilitated by a blade fixedly attached to one end of the rigid extension, perhaps with use of an epoxy resin. It has been mentioned that the principal intended use for the hand held portable reciprocating power tools currently on the market is that of a jig saw and therefore the reciprocating member of such a tool is typically adapted for attachment of a jig saw blade. The attachment suggested therefore possesses form and dimensions similar to one end of such a blade.

A fuller appreciation of the principles outlined above, along with an appreciation of the concrete embodiments of said principles considered to comprise the best manner of making and using a device in accordance with the principles relating to the present invention may be achieved with a reading of the detailed discussion below with reference to the drawings attached hereto and briefly described immediately following.

BRIEF DESCRIPTION OF THE DRAWINGS

FIG. 1 is an isometric view taken of a preferred embodiment of the principles relating to the present invention depicting a round extension with a handle suspended between two coil springs further possessing a coupling to a flat platform head of the type used for sanding.

FIG. 2 is a plain elevational view taken from a side of a device in accordance with the principles relating to the present invention depicting a rectilinear extension with a blade head.

FIG. 3 is a cross sectional view taken from FIG. 2 depicting bearing suspension of the handle.

DETAILED DESCRIPTION

Figure 4:
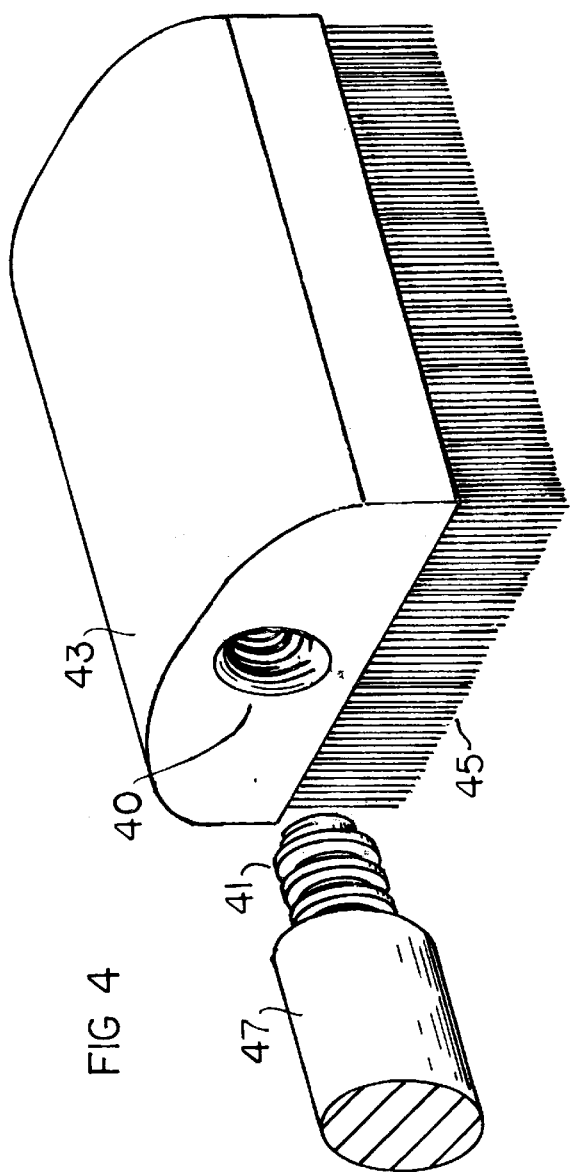
FIG. 4 is an isometric view of a threaded coupling and a brush head.

FIG. 1 represents a first preferred embodiment of the principles relating to the present invention possessing a reciprocating drive attachment 10, a rigid longitudinal extension 11, a sleeve handle 12, a flat platform head 13, a rear spring 14, a forward spring 15, a rear collar 16 and a coupling 17. The reciprocating drive attachment 10 is fixedly attached to one end of the rigid longitudinal extension 11 as shown. The flat platform head 13, in this preferred embodiment, is attached to the forward end of the rigid longitudinal extension 11 with a coupling 19 and the sleeve handle 12 is suspended about the rigid longitudinal extension 11 by the rear spring 14 and the forward spring 15. As seen in FIG. 1, the rear spring 14 has contact with a forward face 26 of a rear collar 16 and the rear end 24 of the sleeve handle 12 while the forward spring 15 has contact with a forward end 25 of the sleeve handle 12 and a rearward face 27 of a forward collar 17. Both these faces 26, 27 are fixed with respect to the rigid longitudinal extension 11 and both collars 16, 17 represent a member fixedly attached to or a portion of said extension 11.

The rear spring 14 and the forward spring 15 are further, in a most preferred embodiment of the principles relating to the present invention, in a state of slight compression. Hence the distance between the forward face 26 of the rear collar 16 and the rearward face 27 of the forward collar 17 is fixed and is slightly less than the combined lengths of the sleeve handle 12, the rear spring 14 and the forward spring 15. This allows both springs 14, 15 and the sleeve handle 12 to be freely disposed about the rigid longitudinal extension 11. Alternatively, both springs 14, 15 may be in tension, with the distance between the forward face 26 of the rear collar 16 and the rearward face 27 of the forward collar 17 being somewhat greater than the combined lengths of the sleeve handle 12 and the unextended free length of both springs 14, 15, which in tension, must be attached at one end the sleeve handle 12 with the other end longitudinally fixed to the rigid longitudinal extension 11.

The reciprocating drive attachment 10, as shown in FIGS. 1 & 3, is comprised of a thin, rectangular shaped blade, essentially, with two apertures therethrough. One aperture fits the peg and the other accommodates the set screw of the reciprocating member (not shown) of a typical portable reciprocating power tool. The reciprocating drive attachment 10 depicted thus resembles the rear portion of a typical jig saw blade. This resemblance is unnecessary to fulfillment of the principles relating to the present invention, but the capability of securely attaching the reciprocating drive attachment 10 to the reciprocating member of a portable reciprocating power tool is required for such fulfillment. The configuration necessary for his attachment is considered, at present, to be fairly standard for such tools, however, other configurations appropriate for portable reciprocating power tools which are simply not readily available at present are considered to be encompassed by the principles relating to the present invention as well as the configuration shown herein.

Other alternative constructions to the first preferred embodiment of the principles relating to the present invention shown in FIG. 1 are considered with reference to FIGS. 2 & 3. Most importantly, it is considered that the sleeve handle 12, which must be disposed about the rigid longitudinal extension 11 and further must be frictionally isolated from the same, may be frictionally suspended by bearings 30. In the construction illustrated in FIGS. 2 & 3 two opposed sets of linear ball bearings 30 are utilized, with each set trapped between an interior surface 32 of the sleeve handle 12 and a longitudinally uniform portion 33 of the exterior surface 31 of the rigid longitudinal extension 11. The rigid longitudinal extension 11 shown in FIGS. 2 & 3 has an exterior surface 31 which is entirely uniform longitudinally. The rigid longitudinal extension 11 depicted in FIG. 1 may also be considered to have longitudinal uniformity of its exterior except for the two collars 14, 17 which represent either members fixedly attached to or portions of the rigid longitudinal extension 11. Longitudinal uniformity, as well as the symmetry and other aspects of uniformity depicted are matters of convenience to construction and, with one exception, are unnecessary to fulfillment of the principles relating to the present invention.

Longitudinal uniformity of a portion 33 of the exterior surface 31 of the rigid longitudinal extension 11 of a length equal to or exceeding the length of longitudinal reciprocation which is predetermined by the portable reciprocating power tool is considered necessary for operation. This predetermined amount of longitudinal reciprocation, ie. travel, is about an inch on current portable reciprocating power tools. In order for the sleeve 12 to be frictionally supported by means of bearings 30 an exterior surface 31 of the rigid longitudinal extension 11 must have a portion 33 which is longitudinally uniform or the interior surface 32 must have a portion which is longitudinally uniform for a length equal to or exceeding the travel. It is not necessary that both members possess such a portion. The bearings 30 might be held longitudinally stationary with respect to the sleeve 12, for instance, as readily imagined for the configuration depicted in FIG. 3, leaving only the concave surface 33 of the rigid longitudinal extension 11 depicted necessarily possessing longitudinal uniformity. No longitudinal uniformity is required of any portion of the construction depicted in FIG. 1, it is merely simpler this way.

It is also noted that a rectilinear construction is employed in the construction depicted in FIGS. 2 & 3, as opposed to the generally round or tubular construction utilized in the preferred embodiment of the principles relating to the present invention depicted in FIG. 1. While the generally round construction facilitates deployment of a pair of conventional coil springs 14, 15, other configurations, rectilinear or otherwise, are readily feasible. And while the linear bearings 30 depicted in FIG. 3 are well suited to the rectilinear construction shown therein, a generally round or tubular construction utilizing a pair of ball bearing races is also readily feasible.

Furthermore, it is readily imagined that linear, tapered or other types of bearings 30, suitably disposed between the sleeve handle 12 and the rigid longitudinal extension 11 will suffice to frictionally suspend the former about the latter. Other means of fulfilling this function, aside from the use of bearings 30 or a pair of coil springs 14, 15, may be readily devised by the routinier. Both of these means specifically depicted serve as examples of what is considered the best manner of frictionally suspending the handle sleeve 12 about the rigid longitudinal extension 11 so that the latter may reciprocate freely while the sleeve handle 12 is grasped and remains relatively stationary with respect to longitudinal displacement. It is noted that the use of a pair of springs 14, 15, as depicted in FIG. 1, as opposed to the use of bearings 30, as shown in FIG. 2, also locates the sleeve handle 12 longitudinally along the rigid longitudinal extension 11 while the sleeve handle 12 depicted in FIG. 2 is not positively located longitudinally.

A stop may be placed upon the rigid longitudinal extension 11 depicted in FIG. 2 both rearward and forward of the sleeve handle 12 which will restrict longitudinal travel of the same, but there is no inherent positive positioning means as in the case depicted in FIG. 1. While this positive positioning longitudinally is considered advantageous, it is not necessary to fulfillment of the principles relating to the present invention. It is necessary that the sleeve handle 12 be allowed travel longitudinally with respect to the rigid longitudinal extension 11 sufficient to accommodate the reciprocation of the rigid longitudinal extension 11 in operation while the sleeve handle 12 is held longitudinally stationary.

Figure 5:
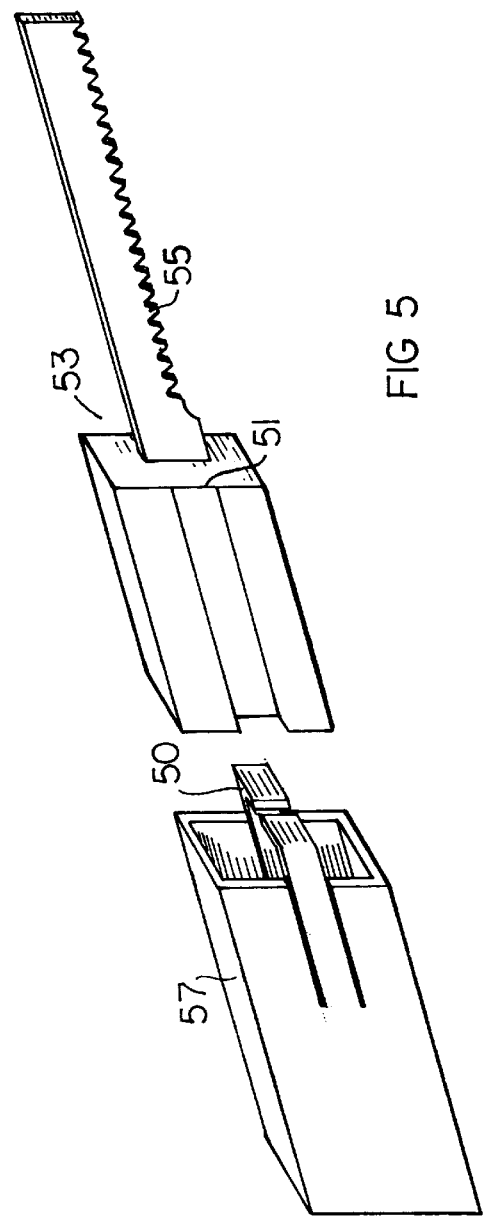
FIG. 5 is an isometric view of a catch coupling and a saw head.

The blade head 23 depicted in FIG. 2 represents a tool head or end which is fixedly attached to the rigid longitudinal extension 11. This is opposed to the use of a coupling 19, 47, 57 as depicted in FIGS. 1, 4 & 5. The blade head 23 depicted in FIG. 2 is further representative of several different types of tool end, namely, knife, scraper and chisel. A knife for cutting gypsum board or drywall specifically suggests itself, as does a thin, resilient flat blade such as that type commonly called a putty knife also is suggested. A chisel for wood working is also specifically suggested. A saw head 53, such as that shown in FIG. 5, is considered as another type of blade end which is of obvious utility. The saw 53 possesses either a serrated edge 55, as shown, or an abrasive edge which is suited to cutting materials such as glass and ceramic tile. Another variation on a blade head 23 specifically suggested is a file which possesses an abrasive surface.

FIG. 4 depicts another general type of tool head or end, a brush head 43 having bristles 45, which is further shown to possess a tapped bore 40 into which the threaded end 41 of the threaded coupling 47 mates. This brush head 43 may more specifically possess wire bristles 45 which are commonly used for removing chipped paint or other material in the preparation of surfaces for painting or other treatments. This brush head 43 may also possess softer bristles 45, either natural or synthetic, which would be useful in cleaning generally. A round brush head 43 or any other configuration may readily be substituted for the rectilinear configuration depicted in FIG. 4. The threaded end 41 and the tapped bore 40 must, of course, be of similar pitch and diameter. In a preferred embodiment of the principles relating to the present invention the pitch and diameter are that which is standard for extension rods and attachable heads used in sanding, scrubbing and painting with a roller. This thread is about five TPI on a root diameter of about half an inch with an overall diameter of about three quarters of an inch.

This preferred thread is also either an Acme or straight form which possesses a flat peak, as shown in FIG. 4 and which yields superior resistance against loosening when subjected to vibration. For this same reason it is recommended that the threaded end 41 or the tapped bore 40 or both be made in a moderately resilient material such as PVC, nylon or other similar hard plastic. A typical portable reciprocating power tool operates at approximately twenty-seven hundred strokes of about an inch length per minute. The standard thread size described above is resistant to loosening under this condition and, of course, permits use of commonly available flat platform heads 13 for sanding and various brush heads 43 among others.

FIG. 5 depicts an alternative catch coupling 57 utilizing a catch 51 on the end of a saw head 53 which is engaged by a pair of hooks 50 upon the catch coupling 57. The catch 51 shown comprises a depressed track ending in a straight edge on the front face of the saw head 53 and each hook 50 is comprised of a resilient member extending forward of the front face of the coupling 57. Many other types of catches, using hooks and eyes, resilient, rigid, movable or stationary components may be readily devised by the routinier.

The type depicted in FIG. 5 is simply an alternative example of another means of facilitating the attachment of one of a variety of different tool ends or heads to the forward end of the rigid longitudinal extension 11 which demonstrates several aspects of construction which are different than the threaded coupling 47 discussed above. While a threaded coupling 47, at least for the portion which is threaded, must be cylindrical or round in form, a catch coupling 57, as illustrated in FIG. 5, may readily be rectilinear in form. It may also be cylindrical or possess any other configuration although it is recommended that one portion have male and the other female characteristics with relation to each other. In this alternative example the saw head 53 is male and the catch coupling 57 is female, as opposed to the male threaded coupling 47 and female brush head 43 depicted in FIG. 4.

This arrangement is not related to any inherent physical characteristic. A tool head 13, 43, 53 may be male or female whether it has a detent or is threaded and the coupling 19 may be male or female whether it has a detent or threading. Nor does a coupling 19 require male and female mating. A tool head 13, 43, 53 might be attached by means of a pair of screws, for example, by a pair of clips, by a pair of cam devices commonly known as 'toggle clamps' or any other suitable means. As discussed in connection to the device depicted in FIG. 2, a tool head 23 may be fixedly attached to the rigid longitudinal extension 11. The means of attachment is unimportant other than for the ability to resist accidental detachment during use.

With regard to construction and materials, the threaded coupling 47 of the preferred embodiment of the principles relating to the present invention depicted in FIG. 3 has been discussed. It is further been recommended that the reciprocating drive attachment 10 be made of a high quality steel with superior resilience and high tensile strength. It is also suggested that the sleeve handle 12, if frictionally suspended about the rigid longitudinal extension 11 by a pair of springs 14, 15 as depicted in FIG. 1, be made from a tubular extrusion of suitable diameter and wall thickness. A hard plastic such as PVC or any other material which is readily extruded, such as aluminum, is suitable. The rigid longitudinal extension 11 is preferably made of a fairly light weight material such as a wood rod or aluminum tubing.

In the alternative preferred embodiment of the principles relating to the present invention depicted in FIGS. 2 & 3, either formed steel or aluminum is suggested for both the sleeve handle 12 and the rigid longitudinal extension 11 since both have direct contact with the bearings 30. The surfaces which contact the bearings 30 should possess high hardness and resistance to wear. In this connection it is noted that the two preferred embodiments depicted in FIGS. 1–3 illustrate similar devices with somewhat different characteristics. That depicted in FIG. 1 is suited to lighter construction and therefore a longer extension and lighter work. The embodiment depicted in FIGS. 2 & 3 is suited to heavier construction, shorter extension and heavier work. This is suggested by the blade head 23 of the alternative preferred embodiment and by the flat platform head 13 depicted for the first preferred embodiment. Other details of construction and choices in materials are considered to be obvious to one practiced in the art.

It is emphasized that the above detailed description of the preferred embodiments in accordance with the principles relating to the present invention is intended to facilitate the ability of one practiced in the art to make and use the same.

It is not intended to restrict in any manner the scope of the intellectual property secured by Letters Patent for which I hereby claim:

1. A device intended for use as an attachment to a portable reciprocating power tool having a reciprocating drive member operating with a predetermined length of travel, said device comprising:

a rigid longitudinal extension, a sleeve handle, a tool head, a reciprocating drive attachment and frictional suspension means;

said rigid longitudinal extension comprising a substantially rigid member possessing a forward end and a rear end;

said tool head being fixedly attached to said forward end of said rigid longitudinal extension;

said reciprocating drive attachment extending substantially parallel with and in longitudinally rigid attachment to said rear end of said rigid longitudinal extension, said reciprocating drive attachment further possessing a configuration enabling secure attachment to the reciprocating drive member of a portable reciprocating power tool characterized by substantially flat extension of greater length than width and greater width than thickness of and possession of a shape and dimensions consistent with that of the butt end of a conventional reciprocating saw blade utilized in a portable electrically driven reciprocating saw;

said sleeve handle possessing an exterior surface which may be grasped by one hand disposed about a substantially uniform exterior surface portion of said rigid longitudinal extension and frictionally suspended about the same by said frictional suspension means allowing said rigid longitudinal extension to reciprocate throughout the full length of said travel while said sleeve handle is longitudinally stationary;

whereby said reciprocating drive attachment, securely attached to the reciprocating drive member of a portable reciprocating power tool, during operation of said power tool causes said rigid longitudinal extension and said tool head both to reciprocate throughout said travel whereas said sleeve handle, grasped by one hand, remains longitudinally stationary with respect to the reciprocating rigid longitudinal extension and the reciprocation of said tool head can be guided with the hand grasping said sleeve handle and is insulated from the vibration associated with operation.

2. The device of claim 1 wherein said tool head is comprised of a flat platform suitable for sanding.

3. The device of claim 1 wherein said tool head is comprised of a brush.

4. The device of claim 1 wherein said tool head is comprised of a blade.

5. The device of claim 1 wherein said frictional suspension means is comprised of at least two bearings each possessing contact with an exterior surface of said rigid longitudinal extension and an interior surface of said sleeve handle.

6. The device of claim 5 wherein said bearings are linearly disposed.

7. The device of claim 1 wherein said frictional suspension means is comprised of two coil springs, one disposed forward and one disposed rearward of said sleeve handle, each spring further disposed about said rigid longitudinal extension with one end contacting one end of said sleeve handle and one end contacting a member fixedly attached to said longitudinal extension.

8. The device of claim 7 wherein each said coil spring is in a state of compression between one said end of said sleeve handle and one said member fixedly attached to said longitudinal extension.

9. A device intended for use as an attachment to a portable reciprocating power tool having a reciprocating drive member operating with a predetermined length of travel, said device comprising:

a rigid longitudinal extension, a sleeve handle, a coupling, a reciprocating drive attachment and frictional suspension means;

said rigid longitudinal extension comprising a substantially rigid member possessing a forward end and a rear end;

said coupling being fixedly attached to said forward end of said rigid longitudinal extension and enabling the removable attachment of one of a variety of tool heads;

said reciprocating drive attachment extending substantially parallel with and in longitudinally rigid attachment to said rear end of said rigid longitudinal extension, said reciprocating drive attachment further possessing a configuration enabling secure attachment to the reciprocating drive member of a portable reciprocating power tool characterized by substantially flat extension of greater length than width and greater width than thickness of and possession of a shape and dimensions consistent with that of the butt end of a conventional reciprocating saw blade utilized in a portable electrically driven reciprocating saw;

said sleeve handle possessing an exterior surface which may be grasped by one hand disposed and frictionally suspended about said rigid longitudinal extension by said frictional suspension means allowing said rigid longitudinal extension to reciprocate throughout the full length of said travel while said sleeve handle is longitudinally stationary;

whereby said reciprocating drive attachment, securely attached to the reciprocating drive member of a portable reciprocating power tool, during operation of said power tool causes said rigid longitudinal extension and a tool head attached to the forward end of said longitudinal extension with said coupling both to reciprocate throughout said travel whereas said sleeve handle, grasped by one hand, remains longitudinally stationary with respect to the reciprocating rigid longitudinal extension and the reciprocation of said tool head can be guided with the hand grasping said sleeve handle and is insulated from the vibration associated with operation.

10. The device of claim 9 wherein said tool head is comprised of a flat platform suitable for sanding.

11. The device of claim 9 wherein said tool head is comprised of a brush.

12. The device of claim 9 wherein said tool head is comprised of a blade.

13. The device of claim 9 wherein said frictional suspension means is comprised of at least two bearings each possessing contact with an exterior surface of said rigid longitudinal extension and an interior surface of said sleeve handle.

14. The device of claim 13 wherein said bearings are linearly disposed.

15. The device of claim 9 wherein said frictional suspension means is comprised of two coil springs, one disposed forward and one disposed rearward of said sleeve handle, each spring further disposed about said rigid longitudinal extension with one end contacting one end of said sleeve handle and one end contacting a member fixedly attached to said longitudinal extension.

16. The device of claim 15 wherein each said coil spring is in a state of compression between one said end of said sleeve handle and one said member fixedly attached to said longitudinal extension.

17. The device of claim 9 wherein said coupling utilizes catch means to removably attach one of a variety of tool heads to the forward end of said longitudinal extension.

18. The device of claim 9 wherein said coupling utilizes threading to removably attach one of a variety of tool heads to the forward end of said longitudinal extension.

19. The device of claim 18 wherein the diameter of said threading is between one half inch and one inch.

20. The device of claim 18 wherein the pitch of said threading is more than three and less than ten threads per inch.

\* \* \* \* \*